(12) United States Patent
Mundorf

(10) Patent No.: US 11,834,102 B1
(45) Date of Patent: Dec. 5, 2023

(54) VEHICLE ROOF BRACE SUPPORT APPARATUS

(71) Applicant: Mitch Mundorf, Atlantic, IA (US)

(72) Inventor: Mitch Mundorf, Atlantic, IA (US)

( * ) Notice: Subject to any disclaimer, the term of this patent is extended or adjusted under 35 U.S.C. 154(b) by 70 days.

(21) Appl. No.: 17/704,647

(22) Filed: Mar. 25, 2022

Related U.S. Application Data

(60) Provisional application No. 63/167,247, filed on Mar. 29, 2021.

(51) Int. Cl.
*B62D 25/06* (2006.01)
*B62D 27/02* (2006.01)
*B60R 11/00* (2006.01)
*B62D 31/00* (2006.01)

(52) U.S. Cl.
CPC .............. *B62D 25/06* (2013.01); *B60R 11/00* (2013.01); *B62D 27/02* (2013.01); *B60R 2011/0028* (2013.01); *B62D 31/00* (2013.01)

(58) Field of Classification Search
CPC ........ B62D 25/06; B62D 27/02; B62D 31/00; B60R 11/00; B60R 2011/0028
See application file for complete search history.

(56) References Cited

U.S. PATENT DOCUMENTS

| 4,238,951 A | * | 12/1980 | Grainger | B21D 1/14 72/457 |
| 2005/0076700 A1 | * | 4/2005 | Venalainen | B21D 1/06 72/705 |
| 2011/0146362 A1 | * | 6/2011 | Sarrion Sanchez | B21D 1/10 72/63 |

FOREIGN PATENT DOCUMENTS

| CN | 203833466 U | * | 9/2014 | |
| CN | 110239630 A | * | 9/2019 | |
| CN | 109483128 B | * | 11/2019 | |
| DE | 20122676 U1 | * | 4/2007 | ............... B60P 3/08 |
| FR | 2930737 A1 | * | 11/2009 | ............... B21D 1/06 |
| WO | WO-0228748 A1 | * | 4/2002 | ............... B60P 3/08 |
| WO | WO-2009097010 A1 | * | 8/2009 | ............... B60P 3/341 |

* cited by examiner

*Primary Examiner* — Karen Beck
(74) *Attorney, Agent, or Firm* — Nasr Patent Law LLC; Faisal K. Abou-Nasr

(57) ABSTRACT

A vehicle roof brace support apparatus includes a support beam with at least two fasteners located on opposite ends of the support beam. The fasteners are configured to couple the support beam to a vehicle roof or vehicle frame so that the support beam is suspended below a roof brace of the vehicle roof. The vehicle roof brace support apparatus further includes a plurality of jacks coupled to the support beam and configured to engage the roof brace in order to stabilize the roof brace when the vehicle roof is being repaired.

5 Claims, 2 Drawing Sheets

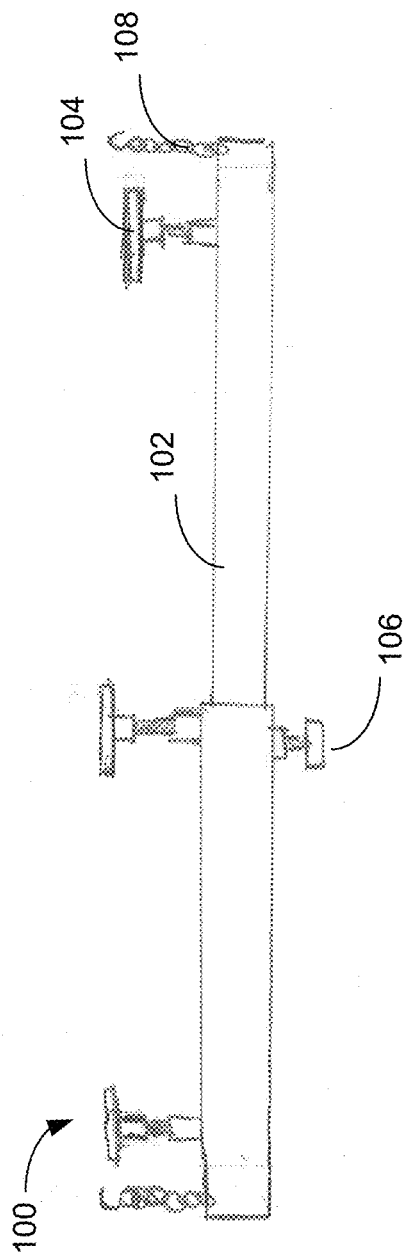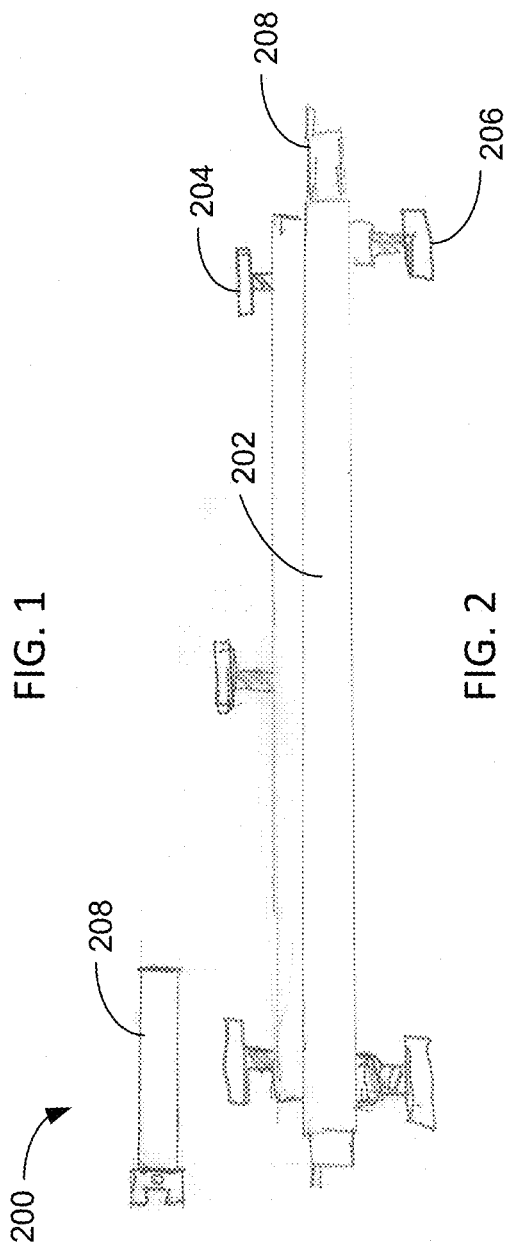

VEHICLE ROOF BRACE SUPPORT APPARATUS

CROSS-REFERENCE TO RELATED APPLICATIONS

The present application claims the benefit under 35 U.S.C. § 119(e) of U.S. Provisional Application No. 63/167,247, filed Mar. 29, 2021, and titled "VEHICLE ROOF BRACE SUPPORT APPARATUS," which is incorporated herein by reference in its entirety.

TECHNICAL FIELD

The present disclosure relates to vehicular repair tools.

BACKGROUND

Often vehicle roof repairs, such as roof dent repairs after a hailstorm, require removal of the vehicle roof liner and exertion of force on the inside of the vehicle roof to restore dented portions of the roof to their original form. Sometimes this process can cause a vehicle roof brace to dislodge from the vehicle roof. For example, the roof brace may become unglued, dislodged, or bent from using the roof brace as a fulcrum point to push or pry dents from the underside of the roof panel. Consequently, there is a need for apparatuses or systems that can help support or stabilize vehicle roof braces during repairs.

SUMMARY

A vehicle roof brace support apparatus is disclosed. In embodiments, the vehicle roof brace support apparatus includes a support beam with at least two fasteners located on opposite ends of the support beam. The fasteners are configured to couple the support beam to a vehicle roof or vehicle frame so that the support beam is suspended below a roof brace of the vehicle roof. The vehicle roof brace support apparatus further includes a plurality of jacks coupled to the support beam and configured to engage the roof brace in order to stabilize the roof brace when the vehicle roof is being repaired.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 1 is a schematic illustration of vehicle roof brace support apparatus, in accordance with an example embodiment of this disclosure.

FIG. 2 is a schematic illustration of vehicle roof brace support apparatus, in accordance with an example embodiment of this disclosure.

DETAILED DESCRIPTION

Figure 3:
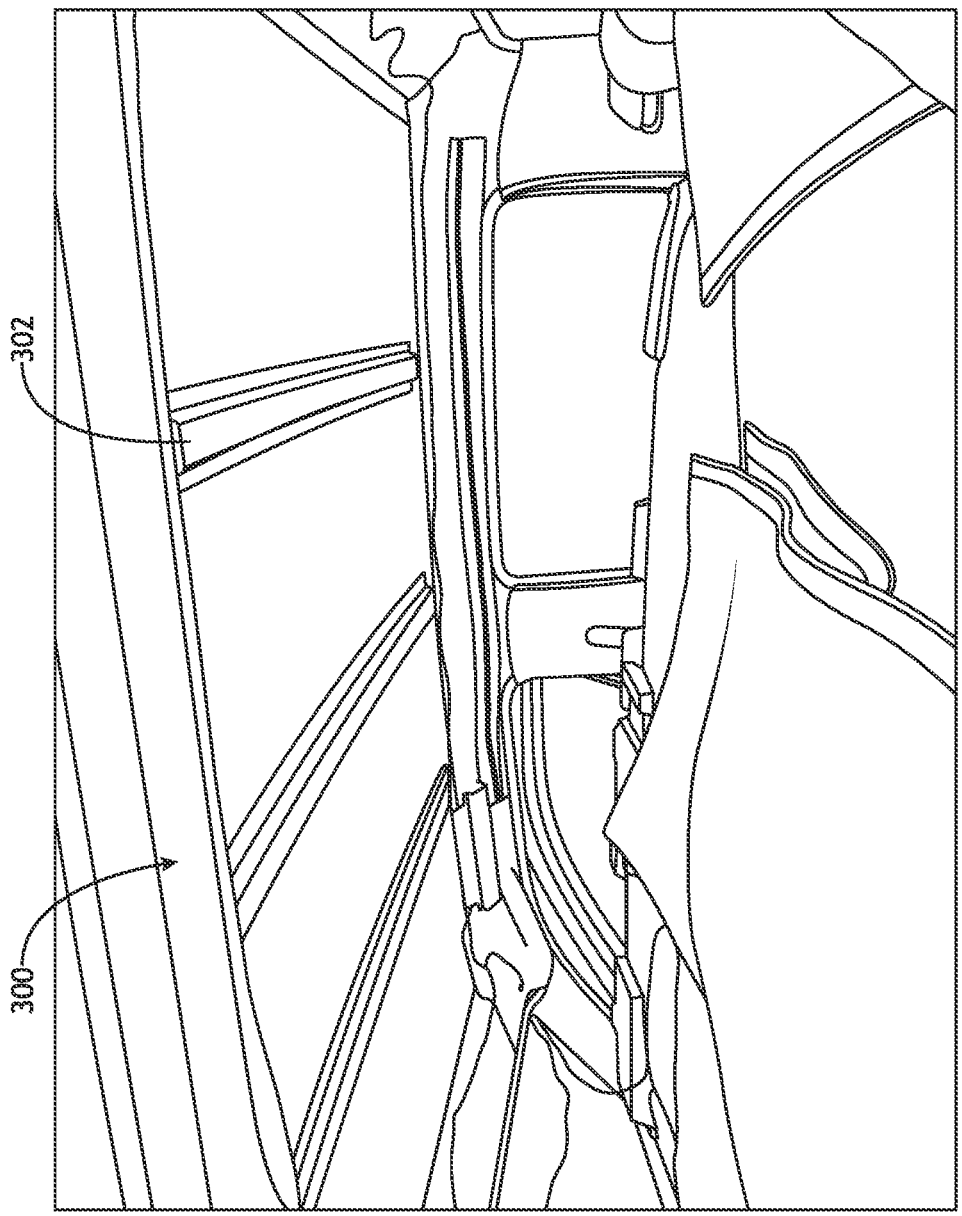
FIG. 3 depicts the inside of a vehicle roof with the roof liner removed, in accordance with an example embodiment of this disclosure.

Reference will now be made in detail to the subject matter disclosed, which is illustrated in the accompanying drawings.

Referring generally to FIGS. 1 through 3, a vehicle roof brace support apparatus is disclosed.

In an example embodiment illustrated in FIG. 1, a vehicle roof brace support apparatus 100 includes a support beam 102 with at least two fasteners 108 (e.g., hooks or other connectors) located on opposite ends of the support beam 102. The fasteners 108 are configured to couple the support beam 108 to a vehicle roof 300 or vehicle frame so that the support beam 102 is suspended below a roof brace 302 of the vehicle roof 300. The vehicle roof brace support apparatus 100 further includes a plurality of jacks 104 coupled to the support beam 102 and configured to engage the roof brace 302 in order to stabilize the roof brace 302 when the vehicle roof 300 is being repaired.

The jacks 104 may be adjustable and configured to extend vertically from the support beam 102 to adjust a height of the vehicle roof brace support apparatus 100 to an appropriate height for engaging the roof brace 302 in order to stabilize the roof brace 302 when the vehicle roof 300 is being repaired. For example, the jacks 104 may be attached to the support beam 102 by a threaded coupling so that rotating each jack 104 in a first direction (e.g., clockwise) causes the jack 104 to retract into the support beam 102 so that the height is reduced and rotating the jack 104 in an opposite direction (e.g., counterclockwise) causes the jack 104 to extend upwardly/vertically from the support beam 102 so that the height is increased.

The support beam 102 may also be adjustable. For example, the support beam 102 may be extendable (and/or retractable) to adjust a length of the vehicle roof brace support apparatus 100 to an appropriate length for suspending the support beam 102 from the vehicle roof 300 or vehicle frame. In some embodiments, the support beam 102 includes a first beam portion that is configured to partially slide into a second beam portion so that the length of the support beam 102 can be adjusted by sliding the first beam portion to a desired position relative to the second beam portion. The support beam 102 may include a locking mechanism 106 (e.g., a set screw, pin, clamp, or the like) that holds the first beam portion and the second beam portion in a locked position after the length of the support beam 102 has been adjusted to an appropriate length for suspending the support beam 102 from the vehicle roof 300 or vehicle frame.

The fasteners 108 may also be adjustable (e.g., as described below with reference to the fasteners 208 illustrated in FIG. 2).

In another example embodiment illustrated in FIG. 2, a vehicle roof brace support apparatus 200 includes a support beam 202 with at least two fasteners 208 (e.g., clips or other connectors) located on opposite ends of the support beam 202. The fasteners 208 are configured to couple the support beam 208 to a vehicle roof 300 or vehicle frame so that the support beam 202 is suspended below a roof brace 302 of the vehicle roof 300. The vehicle roof brace support apparatus 200 further includes a plurality of jacks 204 coupled to the support beam 202 and configured to engage the roof brace 302 in order to stabilize the roof brace 302 when the vehicle roof 300 is being repaired.

The jacks 204 may be adjustable and configured to extend vertically from the support beam 202 to adjust a height of the vehicle roof brace support apparatus 200 to an appropriate height for engaging the roof brace 302 in order to stabilize the roof brace 302 when the vehicle roof 300 is being repaired. For example, the jacks 204 may be attached to the support beam 202 by a threaded coupling so that rotating each jack 204 in a first direction (e.g., clockwise) causes the jack 204 to retract into the support beam 202 so that the height is reduced and rotating the jack 204 in an opposite direction (e.g., counterclockwise) causes the jack 204 to extend upwardly/vertically from the support beam 202 so that the height is increased.

The fasteners 208 may also be adjustable. For example, the fasteners 208 may be configured to extend horizontally from the support beam 202 (or retract into the support beam 202) to adjust a length of the vehicle roof brace support apparatus 200 to an appropriate length for suspending the support beam 202 from the vehicle roof 300 or vehicle frame. The support beam 202 may include locking mechanisms 206 (e.g., set screws, pins, clamps, or the like) that hold the fasteners 208 in a locked position after a length of the vehicle roof brace support apparatus 200 (i.e., the length of the support beam 202 plus fasteners 208) has been adjusted to an appropriate length for suspending the support beam 202 from the vehicle roof 300 or vehicle frame.

The support beam 202 may also be adjustable (e.g., as described above with reference to the support beam 102 illustrated in FIG. 1).

Although the technology has been described with reference to the embodiments illustrated in the attached drawing figures, equivalents may be employed and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A vehicle roof brace support apparatus, comprising:
   a support beam;
   at least two fasteners located on opposite ends of the support beam, the at least two fasteners being configured to couple the support beam to a vehicle roof or vehicle frame so that the support beam is suspended below a roof brace of the vehicle roof; and
   a plurality of jacks coupled to the support beam and configured to engage the roof brace in order to stabilize the roof brace when the vehicle roof is being repaired.

2. The vehicle roof brace support apparatus of claim 1, wherein the support beam is an adjustable support beam that is extendable to adjust a length of the vehicle roof brace support apparatus to an appropriate length for suspending the support beam from the vehicle roof or vehicle frame.

3. The vehicle roof brace support apparatus of claim 1, wherein the at least two fasteners include hooks or clips configured to suspend the support beam from the vehicle roof or vehicle frame.

4. The vehicle roof brace support apparatus of claim 1, wherein the at least two fasteners are configured to extend horizontally from the support beam to adjust a length of the vehicle roof brace support apparatus to an appropriate length for suspending the support beam from the vehicle roof or vehicle frame.

5. The vehicle roof brace support apparatus of claim 1, wherein the plurality of jacks are adjustable jacks are configured to extend vertically from the support beam to adjust a height of the vehicle roof brace support apparatus to an appropriate height for engaging the roof brace in order to stabilize the roof brace when the vehicle roof is being repaired.

* * * * *